(12) United States Patent
Leiber et al.

(10) Patent No.: US 7,054,261 B1
(45) Date of Patent: May 30, 2006

(54) DATA STORAGE MEDIUM INCLUDING OPTICAL INFORMATION CARRIER

(75) Inventors: Jorn Leiber, Heiligenstedtenerkamp (DE); Bernhard Mussig, Seevetal (DE); Stefan Stadler, Hamburg (DE)

(73) Assignee: Tesa AG, Hamburg (DE)

( * ) Notice: Subject to any disclaimer, the term of this patent is extended or adjusted under 35 U.S.C. 154(b) by 0 days.

(21) Appl. No.: 10/030,472

(22) PCT Filed: May 23, 2000

(86) PCT No.: PCT/EP00/04676

§ 371 (c)(1),
(2), (4) Date: May 15, 2002

(87) PCT Pub. No.: WO01/04886

PCT Pub. Date: Jan. 18, 2001

(30) Foreign Application Priority Data

Jul. 12, 1999 (DE) ................. 199 32 902

(51) Int. Cl.
*G11B 3/70* (2006.01)
(52) U.S. Cl. .............. 369/283; 369/288; 369/94
(58) Field of Classification Search ............. 369/15, 369/94, 100, 108, 275.1, 283, 284; 430/288, 430/332, 334, 336, 338, 339
See application file for complete search history.

(56) References Cited

U.S. PATENT DOCUMENTS

| 3,288,389 A | 11/1966 | Gersch et al. |
|---|---|---|
| 3,823,276 A | 7/1974 | Maslowski et al. |
| 3,976,354 A | 8/1976 | Braitberg et al. |
| 4,069,049 A | 1/1978 | Reich et al. |
| 4,085,501 A | 4/1978 | Currie |
| 4,252,400 A | 2/1981 | Bernal et al. |
| 4,320,489 A | 3/1982 | Crandall et al. |
| 4,548,889 A | 10/1985 | Nemoto et al. |
| 4,581,317 A | 4/1986 | Simmons, III |
| 4,599,718 A | 7/1986 | Nakagawa et al. |
| 4,638,335 A | 1/1987 | Smith et al. |
| 4,651,172 A | 3/1987 | Watanabe et al. |
| 4,773,060 A | 9/1988 | Shimada et al. |
| 4,800,112 A | 1/1989 | Kano et al. |
| 4,837,745 A | 6/1989 | Eich et al. |
| 4,860,273 A | 8/1989 | Sawano et al. |
| 4,883,741 A | 11/1989 | Takahashi et al. |
| 4,918,682 A | 4/1990 | Finegan |
| 4,933,221 A | 6/1990 | Nishimura et al. |
| 4,970,707 A | 11/1990 | Hara et al. |

(Continued)

FOREIGN PATENT DOCUMENTS

DE 2312328 10/1974

(Continued)

OTHER PUBLICATIONS

Franke Applied Optics vol. 23, No. 16, Aug. 1984 pp. 2729-2733 Optical recording of refractive-index patterns in doped poly-(methyl methacrylate) films.

(Continued)

*Primary Examiner*—Paul W. Huber
(74) *Attorney, Agent, or Firm*—Nixon & Vanderhye, PC

(57) ABSTRACT

An example data storage medium includes an optical information carrier which comprises a polymer carrier, which is set up to store information, and, additionally, a layer. The layer comprises a dye and can be optically changed locally for the purpose of storing information.

27 Claims, 1 Drawing Sheet

U.S. PATENT DOCUMENTS

| | | | |
|---|---|---|---|
| 5,014,259 A | 5/1991 | Goldberg et al. | |
| 5,019,476 A | 5/1991 | Kanno et al. | |
| 5,023,859 A | 6/1991 | Eich et al. | |
| 5,034,943 A | 7/1991 | Antonov et al. | |
| 5,049,462 A | 9/1991 | Funhoff et al. | |
| 5,063,555 A | 11/1991 | Miyoshi et al. | |
| 5,077,724 A | 12/1991 | Gregg | |
| 5,090,008 A | 2/1992 | Clark et al. | |
| 5,090,009 A | 2/1992 | Hamada et al. | |
| 5,098,975 A | 3/1992 | Omelis et al. | |
| 5,109,374 A | 4/1992 | Tsunoda et al. | |
| 5,124,183 A | 6/1992 | Nakano et al. | |
| 5,188,863 A | 2/1993 | De Graaf et al. | |
| 5,205,178 A | 4/1993 | Odernheimer | |
| 5,215,800 A | 6/1993 | Daido et al. | |
| 5,234,799 A | 8/1993 | Nagae et al. | |
| 5,272,689 A | 12/1993 | Tsujioka et al. | |
| 5,289,407 A | 2/1994 | Strickler et al. | |
| 5,297,132 A | 3/1994 | Takano et al. | |
| 5,311,499 A | 5/1994 | Hwang | |
| 5,312,713 A * | 5/1994 | Yokoyama et al. | 430/200 |
| 5,368,789 A | 11/1994 | Kamitakahara et al. | |
| 5,369,631 A | 11/1994 | Hwang | |
| 5,382,463 A | 1/1995 | Adkins et al. | |
| 5,447,767 A | 9/1995 | Tanabe et al. | |
| 5,459,019 A | 10/1995 | Kato et al. | |
| 5,508,143 A | 4/1996 | Taniguchi et al. | |
| 5,509,991 A | 4/1996 | Choi | |
| 5,510,171 A | 4/1996 | Faykish | |
| 5,519,517 A | 5/1996 | Redfield et al. | |
| 5,572,492 A | 11/1996 | Ogawa | |
| 5,587,993 A | 12/1996 | Gregg | |
| 5,627,817 A | 5/1997 | Rosen et al. | |
| 5,639,588 A | 6/1997 | Huh | |
| 5,658,411 A | 8/1997 | Faykish | |
| 5,669,995 A | 9/1997 | Hong | |
| 5,744,219 A | 4/1998 | Tahara | |
| 5,764,583 A | 6/1998 | Cliff et al. | |
| 5,800,950 A | 9/1998 | Hirao et al. | |
| 5,838,653 A | 11/1998 | Fan et al. | |
| 5,843,626 A | 12/1998 | Ohta et al. | |
| 5,851,615 A | 12/1998 | Kay | |
| 5,855,979 A | 1/1999 | Umehara et al. | |
| 5,866,236 A | 2/1999 | Faykish et al. | |
| 5,871,881 A | 2/1999 | Nishida et al. | |
| 5,879,774 A | 3/1999 | Taylor et al. | |
| 5,890,674 A | 4/1999 | Major | |
| 5,908,803 A | 6/1999 | Leconte et al. | |
| 5,958,650 A | 9/1999 | Wolleb et al. | |
| 5,998,007 A | 12/1999 | Prutkin et al. | |
| 6,016,210 A | 1/2000 | Stappaerts | |
| 6,016,984 A | 1/2000 | Trafton et al. | |
| 6,168,682 B1 | 1/2001 | Bennett et al. | |
| 6,236,589 B1 | 5/2001 | Gupta et al. | |
| 6,266,166 B1 | 7/2001 | Katsumata et al. | |
| 6,310,850 B1 | 10/2001 | Sochava et al. | |
| 6,338,935 B1 | 1/2002 | Alperovich et al. | |
| 6,364,233 B1 | 4/2002 | Crowley | |
| 6,372,341 B1 | 4/2002 | Jung et al. | |
| 6,383,690 B1 | 5/2002 | Vargas | |
| 6,386,458 B1 | 5/2002 | Leiber et al. | |
| 6,436,483 B1 | 8/2002 | Palmasi et al. | |
| 6,450,642 B1 | 9/2002 | Jethmalani et al. | |
| 6,452,890 B1 | 9/2002 | Kawano et al. | |
| 6,714,437 B1 | 3/2004 | Leiber et al. | |
| 6,789,262 B1 | 9/2004 | Leiber et al. | |
| 2003/0096105 A1 | 5/2003 | Noehte et al. | |
| 2003/0142619 A1 | 7/2003 | Mussig et al. | |
| 2003/0156524 A1 | 8/2003 | Stadler et al. | |
| 2003/0161018 A1 | 8/2003 | Stadler et al. | |
| 2003/0165105 A1 | 9/2003 | Leiber et al. | |
| 2003/0165746 A1 | 9/2003 | Stadler et al. | |
| 2003/0169674 A1 | 9/2003 | Leiber et al. | |
| 2003/0179277 A1 | 9/2003 | Stadler et al. | |
| 2003/0235136 A1 | 12/2003 | Akselrod et al. | |
| 2004/0009406 A1 | 1/2004 | Hesselink et al. | |
| 2004/0030732 A1 | 2/2004 | Gerspach et al. | |
| 2004/0036187 A1 | 2/2004 | Leiber et al. | |
| 2004/0051919 A1 | 3/2004 | Noehte et al. | |
| 2004/0053140 A1 | 3/2004 | Stadler et al. | |
| 2004/0066546 A1 | 4/2004 | Noehte et al. | |
| 2004/0136037 A1 | 7/2004 | Leiber et al. | |
| 2004/0136040 A1 | 7/2004 | Noehte et al. | |
| 2004/0145788 A1 | 7/2004 | Leiber et al. | |

FOREIGN PATENT DOCUMENTS

| | | | |
|---|---|---|---|
| DE | 2910390 | | 10/1979 |
| DE | 3110583 | | 1/1982 |
| DE | 3723522 | | 2/1989 |
| DE | 3810722 | | 6/1991 |
| DE | 19537829 | | 10/1996 |
| DE | 68926896 | | 12/1996 |
| DE | 19808288 | | 9/1999 |
| DE | 29816802 | | 3/2000 |
| DE | 19935776 | | 2/2001 |
| DE | 19947782 | | 4/2001 |
| DE | 10039370 | | 2/2002 |
| DE | 10039374 | | 2/2002 |
| DE | 10039372 | | 3/2002 |
| DE | 3920420 | | 1/2003 |
| DE | 10128902 | | 10/2003 |
| EP | 0 323 167 | | 7/1989 |
| EP | 0 352 194 | | 1/1990 |
| EP | 0 360 144 | | 3/1990 |
| EP | 0 384 041 | | 8/1990 |
| EP | 0 403 971 | | 12/1990 |
| EP | 0 410 205 | | 1/1991 |
| EP | 0 421 761 | | 4/1991 |
| EP | 0 458 604 | | 11/1991 |
| EP | 0 475 336 | | 3/1992 |
| EP | 0 514 589 | | 11/1992 |
| EP | 0 519 633 | | 12/1992 |
| EP | 0 528 134 | | 2/1993 |
| EP | 0 552 887 | | 7/1993 |
| EP | 0 585 076 | | 3/1994 |
| EP | 0 613 126 | | 3/1994 |
| EP | 0 615 233 | | 9/1994 |
| EP | 0 660 262 | | 6/1995 |
| EP | 0 750 308 | | 12/1996 |
| EP | 0 768 353 | | 4/1997 |
| EP | 0 938 255 | | 8/1999 |
| FR | 2703815 | | 10/1994 |
| GB | 2211760 | | 7/1989 |
| JP | 55-080832 | | 6/1980 |
| JP | 58-155543 | | 9/1983 |
| JP | 61-145746 | | 7/1986 |
| JP | 62-231437 | | 10/1987 |
| JP | 63 039381 | | 2/1988 |
| JP | 63-039381 | | 2/1988 |
| JP | 63-304429 | | 12/1988 |
| JP | 1-190494 | | 7/1989 |
| JP | 1-256042 | | 10/1989 |
| JP | 2-98822 | * | 4/1990 |
| JP | 2-105346 | | 4/1990 |
| JP | 2-118632 | | 5/1990 |
| JP | 3-23517 | * | 1/1991 |
| JP | 3-134852 | | 6/1991 |
| JP | 3-147540 | | 6/1991 |
| JP | 03 164293 | | 7/1991 |
| JP | 3-164293 | | 7/1991 |
| JP | 4-197781 | | 7/1992 |
| JP | 5-046061 | | 2/1993 |
| JP | 5-109234 | | 4/1993 |

| | | | | | | |
|---|---|---|---|---|---|---|
| JP | 5109121 | | 4/1993 | WO | 02/46845 | 3/2004 |
| JP | 5-334749 | | 12/1993 | WO | 01/04880 | 9/2004 |
| JP | 6-20292 | * | 1/1994 | | | |
| JP | 60-52941 | | 2/1994 | | | |
| JP | 6-60461 | * | 3/1994 | | | |
| JP | 61-99981 | | 7/1994 | | | |
| JP | 8-273325 | | 10/1996 | | | |
| JP | 9-171235 | | 6/1997 | | | |
| WO | 00/09884 | | 2/2000 | | | |
| WO | 00/54112 | | 9/2000 | | | |
| WO | 00/17864 | | 5/2002 | | | |
| WO | 01/84544 | | 9/2003 | | | |
| WO | 02/15179 | | 9/2003 | | | |

OTHER PUBLICATIONS

CHIP Sep. 1998, p. 194 (Computer Journal, Munich Germany).

Ramanujam et al., "Instant Holography" Applied Physics Letters, vol. 74 (21) pp. 3227-3229 (May 1999).

CHIP Das Computer Magazine, Industrie Baut Auf Plastik, Tesa-Film als Giga-Speicher, pp. 194-198 (1998).

* cited by examiner

DATA STORAGE MEDIUM INCLUDING OPTICAL INFORMATION CARRIER

BACKGROUND AND SUMMARY

The present technology relates to a data storage medium having an optical information carrier which comprises a polymer carrier set up to store information.

DE 298 16 802 describes a data storage medium having an optical information carrier which comprises a polymer film. As material for the polymer film, polymethyl methacrylate and also a polymer film sold by Beiersdorf AG under the designation "Tesafilm kristallklar", which comprises biaxially oriented polypropylene, are specified. In the data storage medium, the polymer film is wound spirally in a plurality of plies onto a winding core, with an adhesion layer between each pair of adjacent plies. Information may be written to the data storage medium by locally heating the polymer film using a write beam of a data drive, as a result of which the refractive index and thus the reflecting power (reflectivity) at the interface of the polymer film are locally changed. This can be detected using a read beam in the data drive. By focussing the write beam or read beam, the information may be written to or read from, respectively, a specific preselected ply of the information carrier. The winding core may be optically transparent and may in its center have a recess which serves to accommodate the read/write device of a data drive. The read/write device is moved relative to the data storage medium, whereas the data storage medium is stationary, so there is no need for the data storage medium to be balanced to take account of rapid rotational movement.

With the existing data storage medium it is already possible to achieve very high storage densities. A further increase in the storage density is, however, desirable.

An exemplary embodiment of the invention provides a data storage medium having an optical information carrier which comprises a polymer carrier set up to store information, wherein the fundamental possibility exists of an increase in the storage density.

The data storage medium of an exemplary embodiment of the invention has an optical information carrier which comprises a polymer carrier set up to store information. The optical information carrier further comprises a layer which comprises a dye and can be optically changed locally in order to store information. In principle, the data storage medium may already have been written with information by the manufacturer; this applies both to the polymer carrier and to the dye layer. It is, however, also conceivable to configure the optical information carrier in such a way that a user is able to input information into the data storage medium, utilizing the polymer carrier and/or the dye layer.

Because the data storage medium comprises not only the polymer carrier set up to store information but also an additional layer which may be used to store information, in principle a very high storage density may be achieved. Embodiments particularly advantageous for this purpose are elucidated later on.

Preferably, the dye can be at least partly bleached out by means of a write beam. In this case, data (information units) can be written into the dye layer by locally bleaching out the dye in accordance with the information that is to be input, using intensive laser pulses, for example. The area for one stored information unit typically has a diameter or a side length of approximately 1 µm. As a result of the partial or complete bleaching-out of the dye, the optical properties at the affected site change distinctly, and this may be detected by a suitable read beam. If, for example, the frequency range of the read beam is attuned to the absorption range of the dye, the absorption of the read beam at a bleached-out site is less than in its vicinity, where there is dye. If, after penetrating the dye layer, the read beam is reflected at an interface of the information carrier, therefore, a distinct read signal is produced by the bleached-out sites. Additionally, changes in the absorption activity owing to the wavelength dependency of the refractive index, which is particularly strong in the region of an absorption band, result in changes in the refractive index. This gives rise locally to changes in reflectivity, and the phase position of a read beam is also influenced. All of this may be utilized in order to obtain a read signal.

The dye may be, for example, a cyanine, a phthalocyanine or a mixture of such substances.

Cyanines and phthalocyanines are currently used in writable CDs. Further examples of the dye are eosin, and eosin B. Besides the dye, the dye layer may also comprise other substances; for example, a binder—in this context, one advantageous embodiment is elucidated later on below.

In one preferred embodiment of the invention, the refractive index of the polymer carrier can be changed locally by heating. A polymer carrier having this property may be designed, for example, in the form of a stretched polymer film, which, for example, is pretensioned in two directions perpendicular to one another within its plane during production. Suitable material for the polymer film includes, for example, polymethyl methacrylate (PMMA) or, in particular, biaxially oriented polypropylene (BOPP), although other materials are also possible. Using a write beam, information units can be written to an information carrier comprising a polymer carrier of this kind. In the case of a stretched polymer film, a high energy density is stored in the film material. By depositing a relatively small amount of energy per unit area, using a write beam, it is then possible to obtain a sharp change in material (for example, a densification of material) by reformation, resulting in a local change in the refractive index and in a change in the optical path length in the material. In this way it is possible, for example, to achieve a change in the refractive index in the order of magnitude of 0.2 in the area locally heated by the write beam, and to do so over an area for a store information unit with a diameter or side length of approximately 1 µm. This leads to a change in the local reflectivity, which is readily detectable by means of a read beam. The details of the local optical change in the polymer carrier on storage of information therefore differ from those associated with the storage of information in the dye layer.

The polymer carrier may be assigned an absorber which is set up to absorb, at least partly, a write beam and to emit the generated heat, at least partly, locally to the polymer carrier. The absorber comprises, for example, dye molecules, which are present in the polymer carrier or in a layer adjacent to the polymer carrier, for example, an adhesion layer (see below) or else the above-elucidated dye layer, and permits a local heating of the polymer carrier, sufficient to change the refractive index, for a relatively low write beam intensity.

A further advantage of the invention is manifested if the information carrier is set up so that the frequency range of a read beam for reading information from the polymer carrier is different from the frequency range of a read beam for reading information from the dye layer. With this embodiment it is in fact possible for the dye layer to have stored in it, or to have had stored in it, data which can be detected only using a read beam whose frequency range has been attuned, for example, to the absorption in the dye, with the dye being virtually transparent to other frequency ranges. For instance, it is possible to use such a data storage medium in a drive attuned to it which has a read device and, optionally, a write device, the read device operating with a read beam whose frequency range is set up only to read information from the polymer carrier but not to read information from the dye layer. In the dye layer, therefore, it is possible to accommodate hidden data which cannot be read with the elucidated drive, something which offers advantages in certain application environments. If, on the other hand, the data storage medium is used in a drive which has a read device and, optionally, a write device, the read device operating with read beams whose frequency ranges have been set up to read information from the polymer carrier and to read information from the dye layer, this drive can be used to recognize all of the stored data, and it is possible to utilize the advantage that the data storage medium of the invention offers a particularly high storage density.

In one preferred embodiment of the invention, the information carrier comprises two or more polymer carrier plies (preferably polymer film plies) through which data or information units may be read from a preselected polymer carrier ply and, optionally, written to a preselected polymer ply. Preferably, there is an adhesion layer between each pair of adjacent polymer carrier plies, in order to fix the polymer carrier plies to one another. A suitable adhesion agent is, for example, an acrylate adhesive which is free from gas bubbles and is crosslinked, for example, chemically or by irradiation with UV or electron beams. If the refractive index of the adhesion layer differs only slightly from the refractive index of the polymer carrier, disruptive reflections of a read beam or write beam at a boundary layer between a polymer carrier ply and an adjacent adhesion layer are minimized. It is particularly advantageous if the difference in refractive indices is less than 0.005. An existing difference in refractive indices may, however, be utilized for the purpose of formatting the data storage medium. In one preferred embodiment, at least one adhesion layer is set up as a dye layer, which can be optically changed locally for the purpose of storing information. It is also possible for two or more, or all of the, adhesion layers between polymer carrier plies to be provided as layers of this kind for storing information. This construction of the data storage medium is particularly compact, since the adhesion layers are utilized not only for bonding the polymer carrier plies but also, at the same time, for information storage. In addition, the adhesion layers may comprise the abovementioned absorber which is set up so as to absorb heat from a write beam and emit it to the polymer carrier.

As the polymer carrier, it is possible to use plate material. As already mentioned, the polymer carrier may alternatively comprise a polymer film, made of biaxially oriented polypropylene (BOPP), for example.

In this case, in one preferred embodiment the information carrier is wound in a spiral fashion, onto an optically transparent winding core, for example, which has a recess in its central region. In this case there is preferably an adhesion layer between each pair of adjacent polymer film plies or winds, said adhesion layer containing dye for the purpose of storing information. In other words, therefore, the information carrier has a coherent adhesion layer which is wound in a spiral fashion in exactly the same way as the polymer film. For example, from 10 to 30 polymer film plies may be wound, or else a greater or lesser number. With a polymer film thickness of between 10 µm and 100 µm, preferably below 50 µm or around 35 µm, the information can be separated from one another with good resolution on different polymer film plies or on different dye plies of the adhesion layer by means of read/write devices that are known, for example, from DVD technology. The adhesion layer may, for example, have a thickness in the range between 1 µm and 40 µm, preferably below 25 µm.

If the data storage medium with spiral-wound information carrier has an optically transparent winding core which has a recess in its central area, it is possible to arrange in said recess a read device and, optionally, a write device of a drive that is attuned to the data storage medium and to move said device(s) relative to the data storage medium, while said data storage medium is stationary, in order to read or write information. A stationary data storage medium has the advantage that it does not have to be balanced in order to allow high rotational speeds, which has favorable consequences for the production costs.

BRIEF DESCRIPTION OF THE DRAWINGS

In the text below, the invention is described in more detail with reference to embodiment examples. The drawings show, in FIG. 1, in parts (a) and (b), diagrammatic representations of two steps for the writing of information to a data storage medium of the invention, and in FIG. 2, a data storage medium of the invention having a spiral-wound optical information carrier, in diagrammatic perspective representation, with parts of a drive attuned to the data storage medium disposed in a recess in the central area of the data storage medium.

DESCRIPTION OF EXAMPLE EMBODIMENTS

Figure 1:
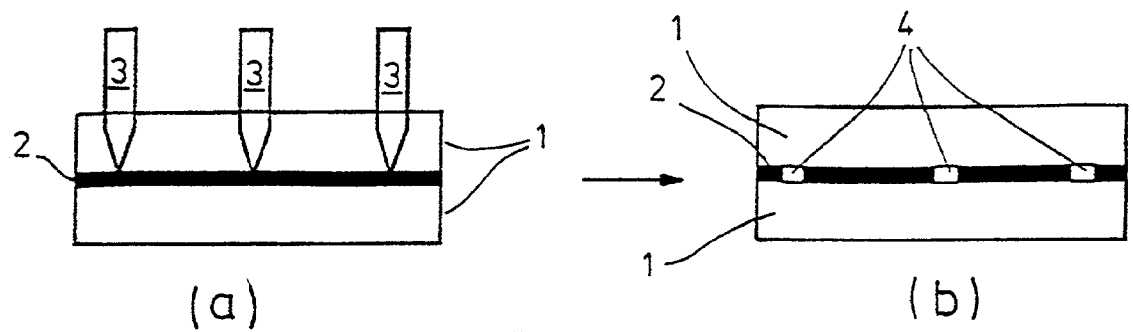

FIG. 1 illustrates the basic construction of the data storage medium of the invention, diagrammatically. Two plies of a polymer carrier 1 have been drawn in, with a layer 2 between them.

The polymer carrier 1 is set up to store information. It may be configured, for example, as a polymer film made of biaxially oriented polypropylene which, when heated locally, contracts in the area exposed to the elevated temperature, and changes its refractive index in that area. This leads to a local change in reflectivity and may be detected by way of a read beam, as already elucidated earlier on.

The layer 2 comprises a dye which can be optically changed locally for the purpose of storing information. Suitable dyes are, for example, cyanines and phthalocyanines which are bleached out on intensive exposure to light. Light of any frequency range which falls into the maximum of the absorption of the dye used is particularly effective. This is because, in this frequency range, depending on the concentration of the dye used, the light is to a large extent or even completely absorbed, leading to destruction of the dye and thus to a change in the optical properties of the layer 2 at the point considered, as already elucidated earlier on.

FIG. 1(a) shows how three write beams 3 in the form of intense laser pulses are focussed on three sites of the layer 2 in order to beach out the dye there and, in that way, to write information to the layer 2. The result is depicted in FIG. 1(b). At the three sites 4, the dye has been bleached out, which may be detected by a read beam for the purpose of reading the information.

Depending on the nature of the change in the local optical properties in the polymer carrier 1 and in the layer 2, write and/or read beams of different kinds—in particular, of different power or different wavelength—are required to write and/or read information for the polymer carrier 1 and for the layer 2.

In FIG. 1(*a*), three write beams 3 have been drawn in. They may be used simultaneously. Also conceivable is the use of a mask which transmits the write beam light only at specified sites, or an optical imaging of an intensive light source onto the layer 2, so that exposure occurs there at specified sites; write techniques of this kind are especially suitable for data storage media which are fully or partly prewritten by a manufacturer, especially in the case of a nonwound information carrier or in the case of a wound information carrier prior to winding. Another possibility is to operate with a single write beam which is directed sequentially onto the desired sites in the layer 2, in respect of which an example is elucidated later on.

Figure 2:
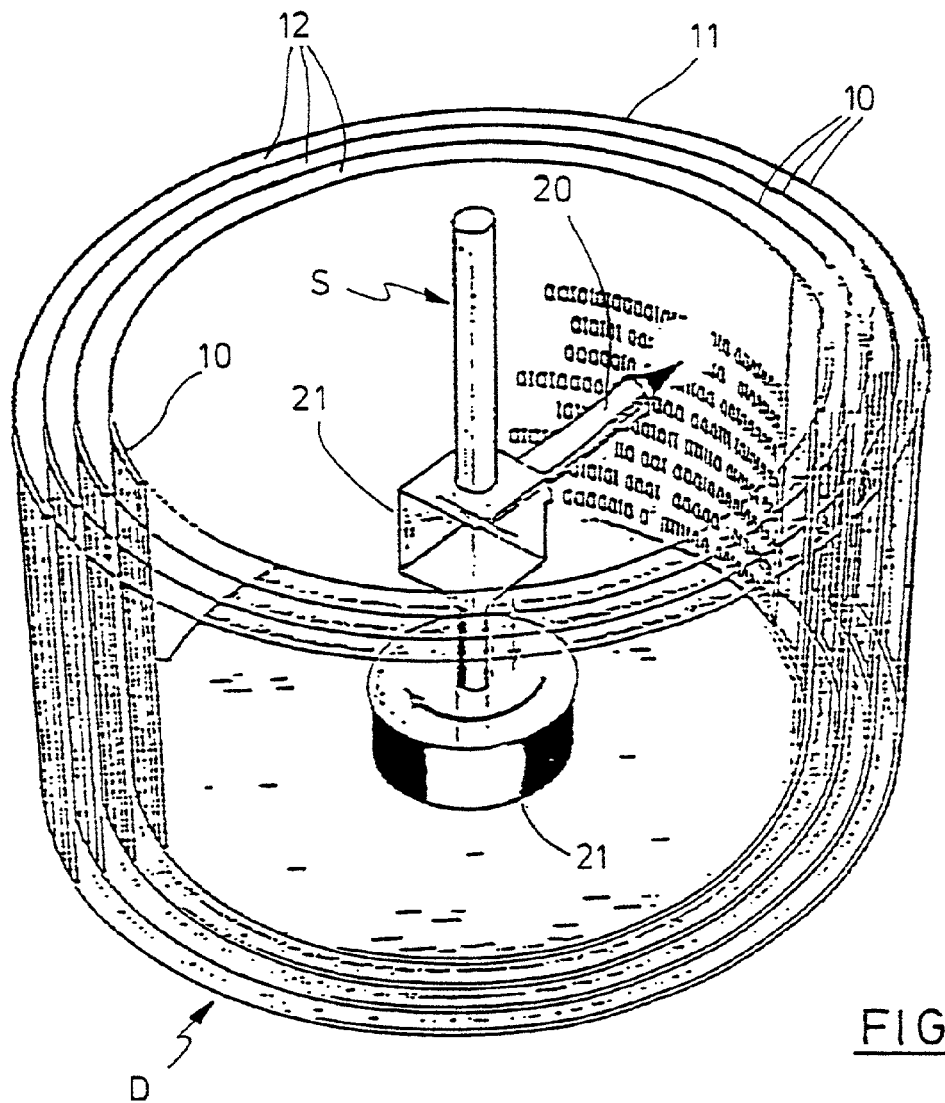

FIG. 2 shows in diagrammatic representation a data storage medium D and a read/write device S of a drive that is attuned to the data storage medium D. The data storage medium D comprises a number of plies 10 of a polymer film 11 which has been wound in a spiral fashion onto an optically transparent, sleeve-like winding core. For ease of comprehension, the winding core has not been depicted in FIG. 2; it is located inside the innermost ply 10. To aid illustration, the individual plies 10 of the polymer film 11 have been shown in FIG. 2 as concentric rings, despite the fact that the plies 10 have been formed by winding the polymer film 11 in a spiral fashion. Between each pair of adjacent plies 10 of the polymer film 11 there is an adhesion layer 12, the adhesion layers 12 extending spirally like the polymer film 11 and therefore being interconnected. For reasons of clarity, the adhesion layers 12 have been drawn in FIG. 2 in an increased thickness which is not to scale.

The polymer film 11 corresponds to the polymer carrier in FIG. 1 and serves as the information carrier. A further component of the information carrier is formed by the coherent adhesion layers 12, which comprise a dye, can be optically changed locally for the purpose of storing information, and correspond to the layer 2 in FIG. 1.

In the embodiment example, the polymer film 11 consists of biaxially oriented polypropylene and prior to winding has been pretensioned (stretched) in both surface directions. The polymer film 11 has a thickness of 35 µm in the embodiment example; other thicknesses in the range from 10 µm to 100 µm or even thicknesses lying outside this range are likewise conceivable. In the embodiment example, the data storage medium D contains twenty plies 10 of the polymer film 11 and has an external diameter of approximately 30 mm. The height of the wound cylinder is 19 mm. A different number of plies 10, or different dimensions, are likewise possible. The number of windings or plies 10 may be, for example, between ten and thirty, but may also be greater than thirty.

The adhesion layers 12 are free from gas bubbles and their base substance in the embodiment example is acrylate adhesive, to which an absorber dye has been admixed in order to make it easier, in the course of a write operation, for heat to be emitted locally to an adjacent ply 10 of the polymer film 11. Additionally, the adhesion layers 12 comprising a dye which serves for storing information by local optical change. In the embodiment example, this dye is copper phthalocynanine, which is admixed to the acrylate adhesive in a concentration of 0.5 to 1.0% by weight and has a preferred absorptivity in the wavelength range around 658 nm. In the embodiment example, the adhesion layers 12 have a thickness of 23 µm, preferred layer thicknesses being between 1 µm and 40 µm.

It is conceivable to use phthalocyanine, for example, in the adhesion layers 12 both as an absorber dye for facilitating the local emission of heat to an adjacent ply 10 of the polymer film 11 and as dye for storing information by local optical change. If the adhesion layers 12 are sufficiently thick, in the order of magnitude of 20 µm, for example, it is possible in this case, by focussing a write beam (see below), to determine whether information is to be deposited in an adhesion layer 12 or in an adjacent ply 10 of the polymer film 11: if the write beam is focussed in the edge region of an adhesive layer 12, i.e., at a site which is close to a ply 10 of the polymer film 11, this leads to local heating in this ply 10 and thus to storage of information in the polymer film 11. If, on the other hand, the write beam is focussed in the middle region of an adhesion layer 12, the closest sites of the polymer film 11 are not sufficiently influenced for information to be stored there, but the site in the middle region of the adhesion layer 12 is optically changed, and this can be detected by an appropriately focussed read beam. With very thin adhesion layers 12, it is not possible to achieve sufficient resolution along the read or write beam by focussing; nevertheless, there is a useful application, since in this case the dye, in the course of the write operation, on the one hand provides for local heating of the polymer 11 and on the other hand is itself optically changed, so that the combined change in the relevant adhesion layer 12 and the relevant ply 10 of the polymer film 11 may be detected with particular ease by a read beam.

The read/write device S arranged in the interior of the winding core comprises a read/write head 20 which can be moved axially backward and forward and rotated in the directions of the arrows that have been drawn in, by means of a mechanism 21. The read/write head 20 comprises optical elements by means of which a beam of light (of wavelength, for example, 630 nm or 532 nm) produced by a laser, which is not shown in FIG. 2, may be focussed onto the individual plies 10 of the polymer film 11. Furthermore, the read/write head 20 is able to focus a beam of light produced by a separate laser, and which is absorbed preferentially by the dye present in the adhesion layers 12, onto the individual adhesion layers 12. Since the read/write head 20 is moved by means of the mechanism 21, it is able to scan fully all of the plies 10 and adhesion layers 12 of the data storage medium D. In the embodiment example, the data storage medium D is stationary. Consequently, there is no need for it to be balanced to take account of a high rotational speed (and there is also no need for it to be unwound or rewound), in contrast to the read/write head 20. For the sake of clarity, the elements provided for balancing the read/write head 20 have not been shown in FIG. 1. The abovementioned lasers are located outside of the read/write head 20 and are stationary; the laser beams are guided into the read/write head 20 via optical elements.

For storing or writing information to the polymer film 11 of the data storage medium D, the first of the two lasers mentioned in the preceding paragraph is operated in the embodiment example with a beam power of approximately 1 mW. The laser beam serves in this case as a write beam and is focussed onto a preselected ply 10 of the polymer film 11, in such a way that the beam spot is smaller than 1 µm, the light energy being introduced in the form of short pulses of approximately 10 µs in duration. The energy of the write beam is absorbed in the beam spot, promoted by the absorber in the adjacent adhesion layer 12, which leads to local heating of the polymer film 11 and thus to a local change in the refractive index and in the reflectivity. During the write operation, the write beam is defocused in the plies adjacent to the ply 10 in question of the polymer film 11, so that the adjacent plies of the polymer film 11 are only slightly heated locally and the stored information is not changed there.

Similarly, to store information in an adhesion layer 12 of the data storage medium D, the second of the two above-mentioned lasers is utilized. Its write beam is focussed onto a preselected adhesion layer 12 and may likewise be operated in pulsed mode, this being done in the embodiment example using pulses with a duration of approximately 10 µs; the initial power of the laser in the embodiment example is approximately 1 mW. In the beam spot, the dye present in the adhesion layer is bleached out. It is also conceivable to operate this laser in continuous wave mode (CW mode).

In order to read stored information from the data storage medium D, the lasers are operated in continuous wave mode (CW mode). Depending on the stored information, the respective read beam focussed onto the desired site of the polymer film 11 or of an adhesion layer 12 is reflected, and the intensity of the reflected beam is detected by a detector in the read/write device S.

The data storage medium may also be of an embodiment which cannot be written by the user. In this case it contains information units which have been written by the manufacturer to the polymer carrier 1 and/or the layer 2. In this case, there is no need for a write function in the user's data drive.

Furthermore, the drive may only comprise a read device and, optionally, a write device for reading and, respectively writing information from and to the polymer carrier 1, respectively. In that case, data input into the layer 2 by, for example, the manufacturer of the data storage medium or by another user, by means of a different drive, cannot be recognized, the reason being, for example, that the layer 2 are transparent virtually everywhere for the frequency range or wavelength range of the read beam used. This offers advantages for some applications.

The information units in the polymer carrier 1 or the polymer film 11 have been formed by changing the optical properties in an area having a preferred size of less than 1 µm. The information may have been stored in binary form; i.e., the local reflectivity adopts only two values at the site of an information unit. In other words, if the reflectivity lies above a fixed threshold value, a "1", for example, is stored at the site in question on the information carrier, and, if it lies below this threshold value or below a different, lower threshold value, a "0" is stored correspondingly. It is, however, also conceivable for the information to be stored in two or more gray stages. This is possible if the reflectivity of the polymer film at the site of an information unit can be changed in a specific way by defined adjustment of the refractive index without saturation being reached. In principle, data may be stored in the layer 2 and/or in an adhesion layer 12 in ways which are analogous to these possibilities.

What is claimed is:

1. A data storage medium, including an optical information carrier which comprises a polymer carrier, which is set up to store information, and, further, as an information storage layer independent of the polymer carrier, a layer which comprises a dye and can be optically changed locally for the purpose of storing information,
wherein the information carrier is set up so that a frequency range of a read beam for reading information from the polymer carrier is different from a frequency range of a read beam for reading information from the dye layer.

2. The data storage medium as claimed in claim 1, wherein the dye can be at least partly bleached out using a write beam.

3. The data storage medium as claimed in claim 1, wherein the dye comprises one or more of the substances selected from the following group: cyanines, phthalocyanines.

4. The data storage medium as claimed in claim 1, wherein the refractive index of the polymer carrier can be changed locally by heating.

5. The data storage medium as claimed in claim 4, wherein the polymer carrier is assigned an absorber which is set up to absorb, at least partly, a write beam and to emit the generated heat, at least partly, locally to the polymer carrier.

6. The data storage medium as claimed in claim 1, wherein the polymer carrier comprises a polymer film.

7. A method of using a data storage medium as claimed in claim 1 in a drive which is attuned thereto, the method comprising reading data from the data storage medium using a read device which is part of the drive and which is operated with a read beam whose frequency range is set up only for reading information from the polymer carrier but not for reading information from the dye layer.

8. The method as claimed in claim 7, wherein the drive further includes a write device.

9. A method of using a data storage medium as claimed in claim 1 in a drive which is attuned thereto, the method comprising reading data from the data storage medium using a read device which is part of the drive and which is operated with read beams whose frequency ranges are set up for reading information from the polymer carrier and for reading information from the dye layer.

10. The method as claimed in claim 9, wherein the drive further includes a write device.

11. A data storage medium, including an optical information carrier which comprises a polymer carrier, which is set up to store information, and, further, as an information storage layer independent of the polymer carrier, a layer which comprises a dye and can be optically changed locally for the purpose of storing information,
wherein the information carrier comprises two or more polymer carrier plies through which information units may be read from a preselected polymer carrier ply.

12. The data storage medium as claimed in claim 11, further comprising an adhesion layer between each pair of adjacent polymer carrier plies.

13. The data storage medium as claimed in claim 12, wherein at least one adhesion layer is set up as a dye layer which can be optically changed locally for the purpose of storing information.

14. The data storage medium as claimed in claim 12, wherein the refractive index of the adhesion layer differs only slightly from the refractive index of the polymer carrier.

15. The data storage medium as claimed in claim 11, wherein information units may be written to a preselected polymer carrier ply.

16. A method of using a data storage medium as claimed in claim 11 in a drive which is attuned thereto, the method comprising reading data from the data storage medium using a read device which is part of the drive and which is operated with a read beam whose frequency range is set up only for reading information from the polymer carrier but not for reading information from the dye layer.

17. The method as claimed in claim 16, wherein the drive further includes a write device.

18. A method of using a data storage medium as claimed in claim 11 in a drive which is attuned thereto, the method comprising reading data from the data storage medium using a read device which is part of the drive and which is operated with read beams whose frequency ranges are set up for reading information from the polymer carrier and for reading information from the dye layer.

19. The method as claimed in claim 18, wherein the drive further includes a write device.

20. A data storage medium, including an optical information carrier which comprises a polymer carrier, which is set up to store information, and, further, as an information storage layer independent of the polymer carrier, a layer which comprises a dye and can be optically changed locally for the purpose of storing information, wherein the information carrier is wound in a spiral fashion and the polymer carrier comprises a polymer film.

21. The data storage medium as claimed in claim 20, further comprising an optically transparent winding core which has a recess in its central region.

22. A method of using a data storage medium as claimed in claim 21 in a drive which is attuned thereto, the method comprising reading data from the data storage medium using a read device which is arranged in the recess in the central region of the winding core and is moved relative to the data storage medium, while the data storage medium is stationary, for the purpose of reading information.

23. The method as claimed in claim 22, further comprising:
writing data to the data storage medium using a write device which is arranged in the recess in the central region of the winding core and is moved relative to the data storage medium, while the data storage medium is stationary, for the purpose of writing information.

24. A method of using a data storage medium as claimed in claim 20 in a drive which is attuned thereto, the method comprising reading data from the data storage medium using a read device which is part of the drive and which is operated with a read beam whose frequency range is set up only for reading information from the polymer carrier but not for reading information from the dye layer.

25. The method as claimed in claim 24, wherein the drive further includes a write device.

26. A method of using a data storage medium as claimed in claim 20 in a drive which is attuned thereto, the method comprising reading data from the data storage medium using a read device which is part of the drive and which is operated with read beams whose frequency ranges are set up for reading information from the polymer carrier and for reading information from the dye layer.

27. The method as claimed in claim 26, wherein the drive further includes a write device.

* * * * *